United States Patent [19]

Johnson

[11] Patent Number: 4,920,357
[45] Date of Patent: Apr. 24, 1990

[54] UNATTENDED REPLACEMENT OF PLOTTER PENS

[75] Inventor: David A. Johnson, Escondido, Calif.

[73] Assignee: Hewlett-Packard Company, Palo Alto, Calif.

[21] Appl. No.: 373,415

[22] Filed: Jun. 29, 1989

[51] Int. Cl.$^5$ .............................................. G01D 9/30
[52] U.S. Cl. .................................. 346/49; 346/139 R
[58] Field of Search ...................... 346/139 R, 49, 141, 346/29, 46, 520

[56] References Cited

U.S. PATENT DOCUMENTS

| | | | |
|---|---|---|---|
| 4,417,258 | 11/1983 | Tribolet et al. | |
| 4,533,924 | 8/1985 | Takahashi. | |
| 4,573,129 | 2/1986 | Tribolet et al. | |
| 4,660,054 | 4/1987 | Kajikawa et al. | 346/139 R |
| 4,677,572 | 6/1987 | Gunderson et al. | 346/139 R |
| 4,716,420 | 12/1987 | Glassett. | |

Primary Examiner—Mark J. Reinhart
Attorney, Agent, or Firm—Roland I. Griffin

[57] ABSTRACT

A computer driven plotter pen includes a turret from which a any one of plurality of different types of pens may be selected. When the plotter determines that a pen has become spent, the spent pen is automatically removed by a pen transfer carriage from the pen turret and discarded. The transfer carriage then removes a fresh replacement pen of like type to the spent discarded pen from a magazine thereof, and installs the replacement pen in the turret which in turn installs it in the plotter pen carriage. No operator involvement is required.

6 Claims, 5 Drawing Sheets

FIG. 2A
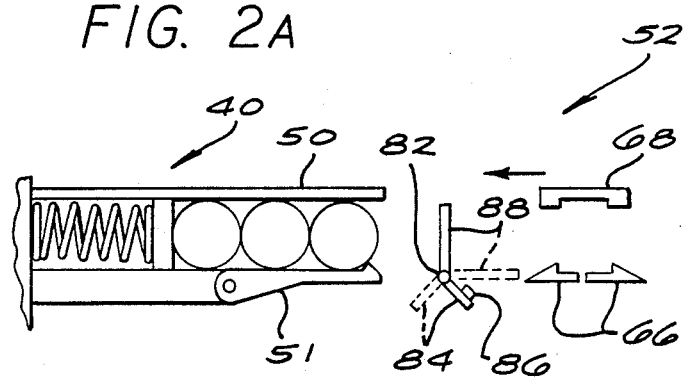
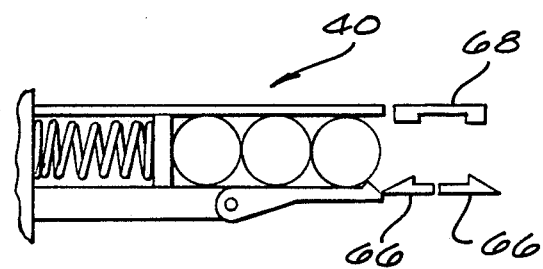
FIG. 2B
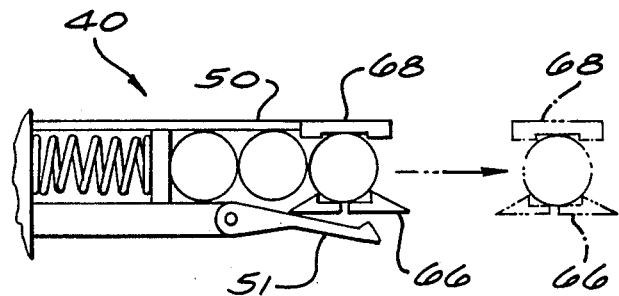
FIG. 2C

FIG. 2D
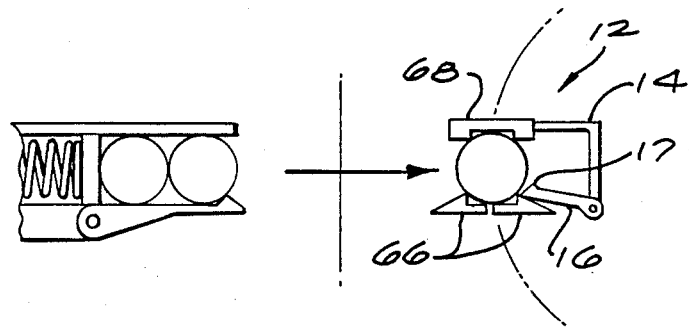
FIG. 2E
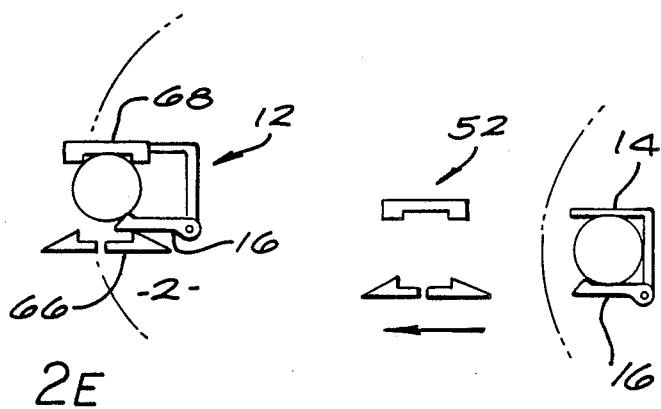
FIG. 2F
FIG. 2G
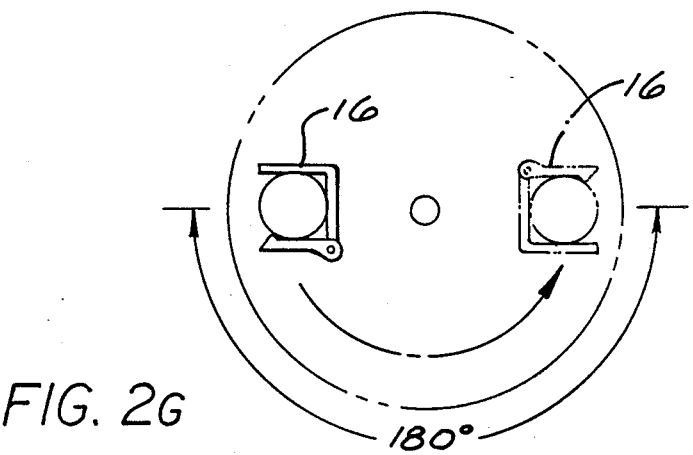

UNATTENDED REPLACEMENT OF PLOTTER PENS

TECHNICAL FIELD

This application relates to computer driven plotters which use a plurality of pens stored in a rotatable turret, and more particularly, to apparatus which is capable of automatically replacing spent plotting pens without the need for human intervention.

BACKGROUND OF THE INVENTION AND PRIOR ART

With the advent of low-cost microprocessors, pen plotters with high speed and resolution have become increasingly sophisticated. Such pen plotters, which are usually driven by command from an external computer, include means for supporting paper or other ink receiving media, a mechanism for moving the paper or other ink receiving media back and forth during plotting, a carriage which supports a pen during the plotting operation, a mechanism for moving the carriage normal to the movement of the paper during plotting, a pen turret for storing a plurality of pens for use in plotting, and a mechanism for rotating the turret.

The use of a pen turret permits utilization of a plurality of pens, such as different colors, different pen tip widths, and the like to provide a variety of pen plots. The microprocessor permits the operator to select the sequence of pens to be used in the plot and then drives the pen turret motor at the appropriate time to rotate the turret when a particular pen is to be selected therefrom.

U.S. Pat. No. 4,417,258, which issued on Nov. 22, 1983 to Tribolet et al., discloses a bidirectional pen chanber in which a pen carriage with gripping claws snatches a pen from a pen stable with cooperating claws for use in drawing, then returns the pen to its stable after use. A plurality of pen stables may be placed at either end of the slider rod for the pen carraige, and the pen stables may be translated perpendicularly to the pen carriage for selective engagement with the pen carriage.

U.S. Pat. No. 4,573,129 which issued on Feb. 25, 1986 to Tribolet et al., discloses how to determine the presence or absence of plotting pens by the use of cooperating claws and an initialization routine that is run whenever the plotter is powered on. This technique works without the use of mechanical switches or optical sensors.

U.S. Pat. No. 4,716,420, which issued on Dec. 29, 1987 to Glassett, discloses a typical prior art arrangement in which a rotatable turret supplies a variety of pens to the pen carriage. This patent also discloses how to rotate the turret without the need of a motor solely for this purpose.

U.S. Pat. No. 4,533,924, which issued on Aug. 6, 1985 to Takahashi, discloses a plotter pen assembly in which an assortment of is part of, and moves with the pen carriage.

These prior art plotters work well for their intended purposes, but each requires that a human operator be present to replace spent pens with fresh ones.

SUMMARY OF THE INVENTION

In accordance with the invention, an arry of pen magazines each containing a plurality of fresh pens of like type is provided at one end of the carriage assembly of a plotter pen which utilizes a turret having slots for holding a plurality of pens of different types. A transfer carriage is located between the magazine and the turret. This transfer carriage removes spent plotter pens from the turret and discards them. Subsequently, the transfer carriage removes a fresh pen from the appropriate magazine which has been positioned to engage the transfer carriage and passes the pen tip through forks which remove a cap form the point end of the pen. Lastly, the transfer carriage installs the fresh pen of like kind in a slot in the turret vacated by the previously spent pen.

This advance over the prior art allows long unattended operations of the plotter, which results in a substantial cost savings to the user.

BRIEF DESCRIPTION OF THE DRAWING

FIGS. 2A–2K each comprise a schematic top plan view of the apparatus sequentially showing the transfer carriage picking a fresh pen from the magazine of replacement pens and delivering it to the turret which is then rotated to deliver the fresh pen to the plotter pen carriage.

DESCRIPTION OF THE PREFERRED EMBODIMENT

Throughout this application, reference will be made to gripping claws or fingers which cooperate to transfer plotter pens. Such claws are well known in the prior art, and examples thereof are disclosed in U.S. Pat. No. 4,573,129, the disclosure of which is incorporated herein by reference.

Figure 1:
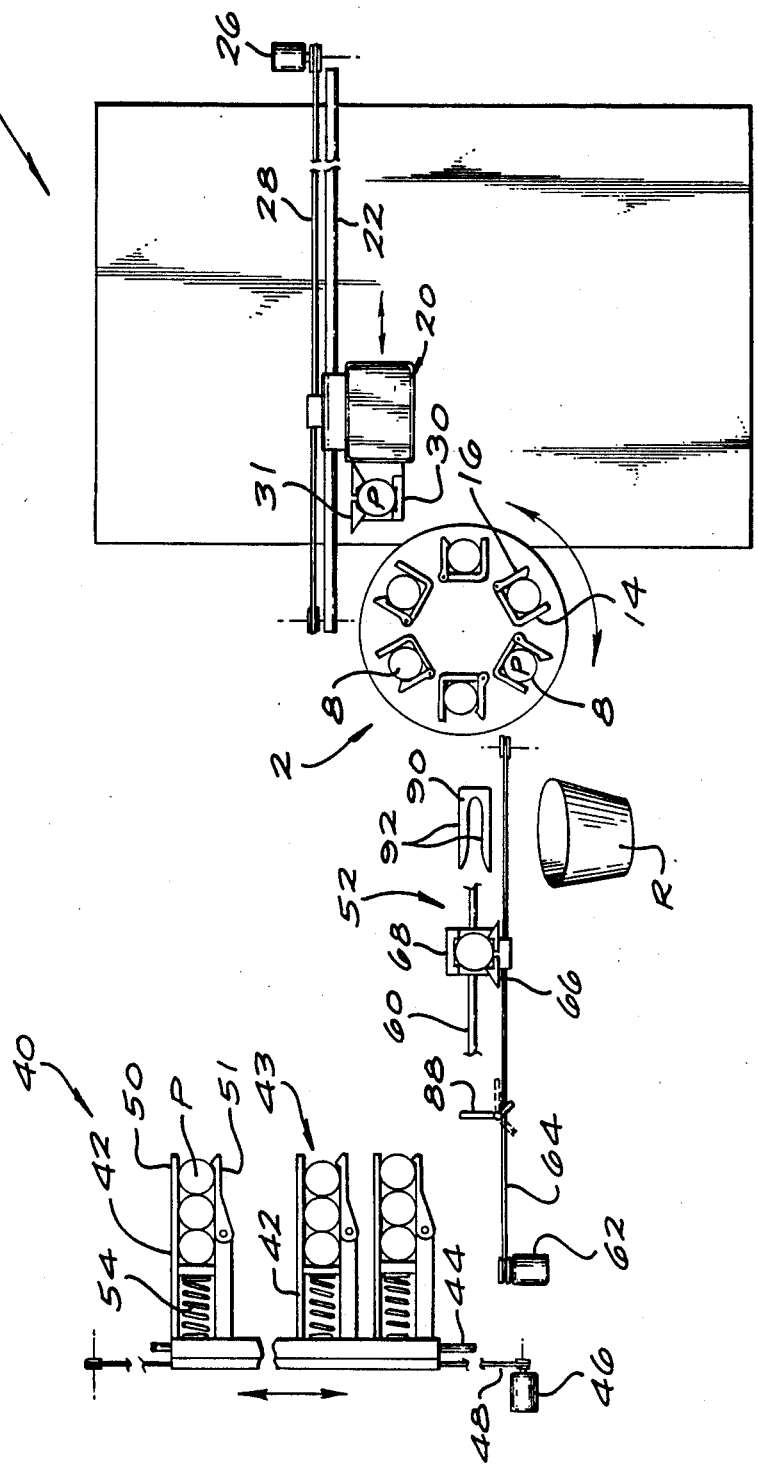
FIG. 1 shows a schematic top plan view of an automatic plotter pen replacement system.

FIG. 1 shows a device for the automatic replacement of spent plotter pens P in a plotter 1. A pen turret 2 of the conventional type as shown generally in U.S. Pat. No. 4,716,420 is provided. The pen turret 2 is mounted on the frame of the plotter proximate one end of a pen carriage slider rod 22. Turret 2 is rotatable about a vertically extending axis and is rotated by a motor, not shown.

Figure 2H:
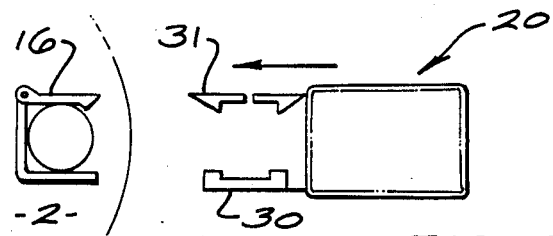
Figure 2I:
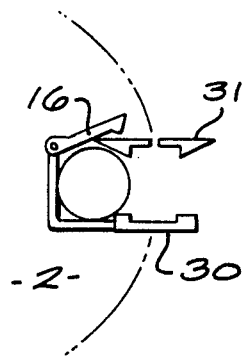
Figure 2J:
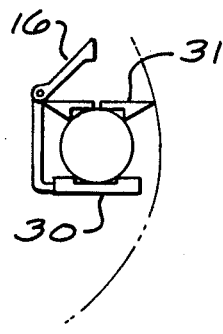
Figure 2K:
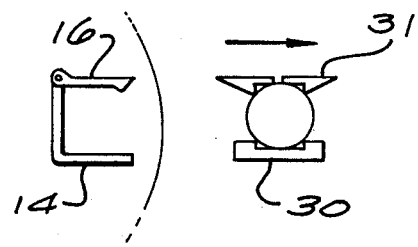

The turret 2 has a plurality of pen slots 8 which each will ordinarily be loaded with a different type of plotting pen P, which may be of various colors and point thicknesses. Each pen P is releaseably held in a slot 8 in the pen turrent 2 by a pair of opposed gripping members 12 mounted in the slot 8. Gripping members 12 preferably comprise a stationary finger 14 and a pivotally mounted finger 16 which is urged toward the stationary finger 14, i.e., to the pen holding position, by inherent resiliency of the gripping members 12 or by a biasing spring, not shown. Fingers 16 have a free end in the form of a truncated barb 17 as shown in FIG. 2D.

Pen carriage 20 is mounted on a slider rod 22 of a carriage assembly to carry a plotting pen P across the drafting surface 24. The position of the pen carriage 20 is controlled by a positioning motor 26 and coupling belt 28. The positioning motor 26 is in turn driven by a central processing unit as is conventional. The pen carriage 20 has a pair of opposed resilient gripping claws 30, 31 mounted thereon, which firmly hold a pen P in position for plotting, and to facilitate the transfer of plotter pens P to and from the turret 2.

A linear array 40 of pen magazine 42 each containing fresh capped pens is mounted on a magazine slider rod 44 for movement in a direction perpendicular to the movement of the pen carriage 20 along slider rod 22. The position of the array 40 may be controlled by a positioning motor 46 and coupling belt 48 or other positioning means which form no part of the present invention. It will be understood by persons skilled in the art that the array 40 of pen magazines need not be a linearly arranged array but could instead be radially arranged on a pen array turret so long as the pen delivery end of each magazine in the array may be appropriately brought into position proximate the transfer carriage to deliver a fresh pen of the appropriate type thereto. The positioning motor 46 is driven by a central processing unit in times relationship with the need to supply fresh pens to the plotter.

For each pen slot 8 on the pen turret 2 there is preferably at least one corresponding pen magazine 42 in the array 40 whereby if each slot 8 holds a different type of pen P, magazines each holding a plurality of pens of one type can be used to replace spent pens of like type in the turret slots. Each pen magazine 42 has a pen delivery or discharge end 43 equipped with a pair of pen gripping members or fingers 50, 51 similar to gripping fingers 14, 16 on turret 20 which hold a fresh replacement pen in position to be removed by a transfer carriage 52. A compression spring 54 or other urging means is provided in each pen magazine 42 to constantly urge the supply of pens toward the gripping fingers 50, 51 at the discharge end 43 of the magazine 42. The spring 54 is chosen to be strong enough to resist an opposing force which is applied by the transfer carriage 52 during a pen transfer operation.

The transfer carriage 52 is mountedon a slider rod 60 for movement between the array of magazines 40 and the pen turret 2. Positioning means in the form of a motor 62 and drive belt 64 move transfer carriage 52 between a rest position seen in FIG. 2A, a fresh pen receiving position seen in FIG. 2C and a fresh pen delivery and spent pen receiving position seen in FIG. 2E. The transfer carriage 52 is equipped with opposed pen gripping claws 66, 68. Claws 66 are positioned such that when the transfer carriage 52 is moved from its rest position (FIG. 2A) through an intermediate position (FIG. 2B) to its fresh pen receiving position (FIG. 2C) claw 66 engages and cams open pivotally mounted finger 51 at the discharge end 43 of the pen magazine. Pivotally mounted gripping finger 51 is normally biased by a spring, not shown, to its upper or pen retaining position.

As the transfer carriage 52 is moted, to the right as seen in the drawings, from its pen receiving position to its spent pen receiving/fresh pen delivery position (FIG. 2E), the carriage 52 is placed in close proximity with the turret 2. As seen in FIGS. 2D and 2E, claws 66 on the carriage 52 are cammed downwardly to open the carriage claws by engagement with the lower surface of pivotally mounted finger 16 of the pen gripping members 12 on the turret 2. Each of the plurality of turret slots 8 has a similar set of pen gripping members 12 mounted therein.

After having received a fresh pen, turret 2 is rotated (through approximately 180° as shown) to the position shown in phantom in FIG. 2G to position the slot having the fresh pen therein adjacent one end of travel of the pen carriage gripping claws 30, 31 in position to deliver the fresh pen to the pen carriage 20 or to receive a spent pen therefrom. To this end, pen carriage gripping claws 30, 31 are of configuration similar to the above described gripping claws 66, 68 on the transfer carriage 52.

Figure 3:
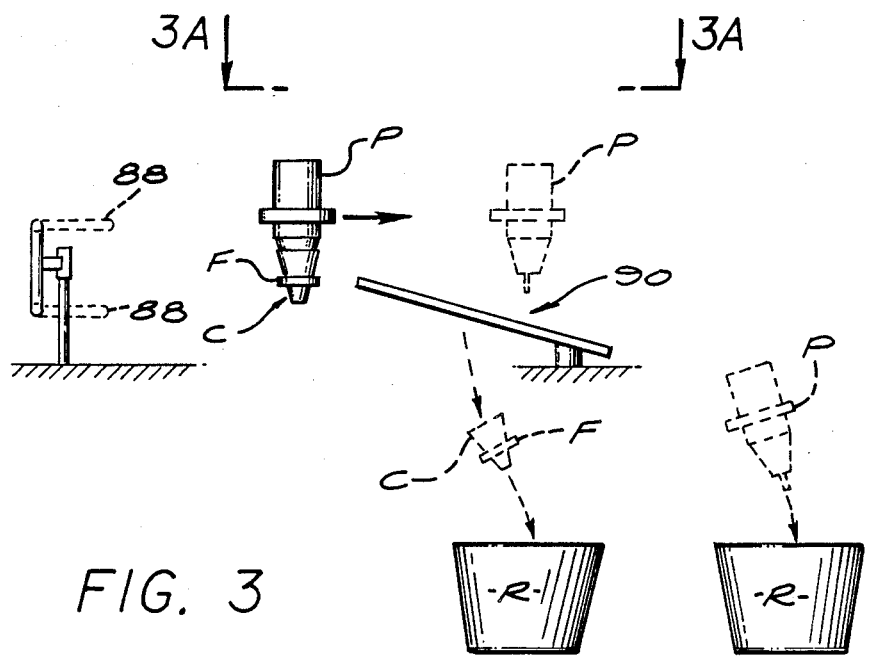
FIG. 3 is a front elevation of a portion of the system of FIG. 1 showing a spent pen blocking gate and a fresh pen cap removing fork to an enlarged scale.

Intermediate the rest position of transfer carriage 52 as seen in FIG. 2A and the pen delivery end 43 of the pen magazine is a spent pen discharge gate 80. Gate 80 comprises a bifurcated angle member mounted for pivotal movement about a vertical axis 82. Gate 80 is spring biased to urge the gate in a counterclockwise direction as shown in solid lines whereby one leg 84 of the gate angle member is normally urged against a stop post 86 and a pair of vertically spaced pen blocking legs 88 (FIG. 3) of the angle member block the path of travel of a spent pen in transfer carriage 52 while preventing tipping of the pen and preventing movement of the pen leftwardly beyond gate 80. Continued leftward movement of the transfer carriage 52 after initial engagement of a spent pen therein with blocking legs 88 causes spreading apart of the claws 66, 68 thus releasing the spent pen which is permitted to fall by gravity to a receptacle or receiving chute. Gate 80 pivotally moves easily in a clockwise direction (as seen in FIG. 1) when a fresh pen in transfer carriage 52 engages the blocking legs 88 without leg 88s dislodging the fresh pen from the transfer carriage 52.

Figure 3A:
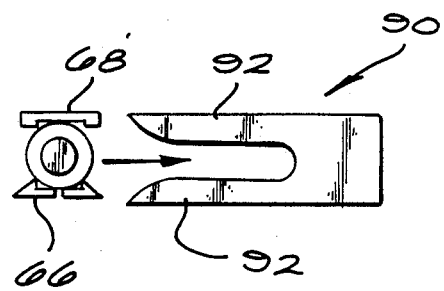
FIG. 3A is a plan view of the pen cap removing fork of FIG. 3.

Each fresh pen in magazine array 40 ordinarily has a removable snap fitted cap thereon which protects the [pen tip from damage and prevents ink leakage or evaporative losses. For removing caps C from the fresh pens, each cap is provided with an annular flange F. The pen cap removal means comprises a statonary inclined fork 90 mounted in fixed position in the path of travel of the transfer carriage 52. Fork 90 has a pair of spaced fingers 92 seen in FIG. 3A disposed vertically above a waste cap receptacle. As capped pens P are held by the transfer carriage 52 for movement to the right toward the turret 2, the flanges F of caps C engage the underside of spaced fingers 92 which bias the cap downwardly to remove the caps C from the fresh pens. The removed caps drop to a receptacle or other means of disposal.

OPERATION

The plotter 1, may use a conventional optical sensor to determine when a plotting pen P is spent. When the current pen is determined to be spent, the sensor transmits a signal to the central processing unit of the plotter apparatus which is programmed to cause the pen P to be lifted from the drafting surface 24 and drafting to temporarily cease for an automatic pen change. The pen carriage 20 is then positioned in close proximity to the pen turret 2 by the action of motor 26 and belt 28. The turret 2, which has not been rotated since the curretn pen P was last removed from it, has an empty slot 8 already in the phantom line position seen in FIG. 2G to receive the spent pen P from the pen carriage 20. The pen carriage 20 is moved toward turret 2 until the pen carriage claw 31 engages the pivotally mounted finger 16 on the turret thus camming the turret finger 16 to the open position to permit spent pen P to be transferred to the gripping means in the empty slot 8 of pen turret 2.

The pen turret 2 is then rotated through approximately 180° to position the turret slot 8 having the spent pen in the solid line position seen in FIG. 2G therein for transfer of the spent pen to the transfer carriage 52 which is then positioned in its spent pen receiving/fresh pen delivery position (FIG. 2E) where the spent pen is transferred to the transfer carriage 52 following the opening of the moveable claw 66 on the transfer carriage 52 by the pivotally mounted finger 16 on the turret 2. Concurrently with this operation, the array 40 of replacement pen magazines 42 is positioned by motor 46 and belt 48 along slider rod 44 such that the magazine 42 which contains replacement pens of type which correspond to the spent pen P, is in alignment for engagement with the transfer carriage 52.

The transfer carriage 52 is next moved (to the left as shown) past its rest position (FIG. 2A) through its intermediate position seen in FIG. 2B at which the spent pen is dropped to a receptacle R as the moveable claw 66 of the transfer carriage is cammed open by the spent pen as the spent pen comes into engagement with the pivotally mounted gate 80 and before the transfer carriage 52 fully reaches its fresh pen receiving position (FIG. 2C) where a replacement pen is transferred from the magazine 42 to the transfer carriage 52.

While the invention has been described with reference to a plotter 1 in which the pen turret 2 is mounted on a stationary portion of the plotter near one end of slider rod 22 of the pen carriage 20, it will be understood that the pen turret 2 may instead be mounted on the pen carriage 20 for movement therewith.

Persons skilled in the art will readily appreciate that various modifications can be made from the preferred embodiment thus the scope of protection is intended to be defined only by the limitations of the appended claims.

I claim:

1. In a computer driven plotter pen apparatus having a moveable plotter pen carriage which has means thereon for releaseably holding a plotter pen in drafting position, the improvement comprising apparatus for the unattended replacement of a spent plotter pen comprising:
   (a) a pen turret mountable on said plotter pen apparatus, said turret having a plurality of pen slots to hold a variety of usable plotting pens, each of said plurality of pen slots having gripping means mounted therein to hold a pen and said pen gripping means being moveable, upon rotation of said turret, between a first pen transfer position and a second pen transfer position;
   (b) means for rotating said turret for moving said pen slots and pen gripping means therein between said first and second positions;
   (c) a plurality of pen magazines each being capable of holding a plurality of fresh plotting pens and having gripping means at one end thereof to hold a fresh pen in a third pen transfer position, and means for moving fresh pens in said magazine towards said third pen transfer position into said pen gripping means;
   (d) means for moving said plurality of pen magazines to selectively position the gripping means of one of said magazines of pens at said third pen transfer position;
   (e) a pen transfer carriage and means for moving said pen transfer carriage between said second pen transfer position for transferring pens to and from said turret, and said third pen transfer position for receiving a fresh pen from one of said pen magazines, said pen transfer carriage having pen gripping means thereon; and
   (f) a spent pen discharge gate disposed between said turret and said magazines for engaging a spent pen in said transfer carriage and releasing said spent pen from said transfer carriage as said transfer carriage moves toward said magazines;
   said pen gripping means on said transfer carriage being engageable with said pen gripping means on said turret when both said turret and said transfer carriage are in said second pen transfer position for transferring a pen therebetween in either direction and being engageable with said pen gripping means on said magazine when said pen carriage is in said third pen transfer position for transferring a pen from said magazine to said transfer carriage, and said means on the plotter pen carriage which releaseably hold a pen in drafting position when said pen gripping means on said turret is in said first pen transfer position for transferring pens between said turret and said plotter pen carriage in either direction.

2. The apparatus of claim 1, further comprising means at said third pen transfer position for engaging a moving fresh pen for removing a cap from said fresh pen and means for receiving removed pen caps, said means for receiving removed caps being disposed below the path of travel of said pens.

3. The apparatus of claim 2, wherein spent pens are discharged from said pen transfer carriage at said third pen transfer position as said fresh pen is received by said gripping means, said spent pens being discharged by gravity to said receiving means.

4. The apparatus of claim 3, wherein said plurality of pen magazines is equal in number to said plurality of pen slots on said turret.

5. The apparatus of any one of the preceeding claims, wherein said means for moving fresh pens in said magazine towards said gripping means comprises resilient means.

6. A computer driven plotter pen apparatus in combination with the apparatus for the unattended replacement of a spent plotter pen of any one of claims 1 through 4.

* * * * *

UNITED STATES PATENT AND TRADEMARK OFFICE
CERTIFICATE OF CORRECTION

PATENT NO.  : 4,920,357
DATED       : April 24, 1990
INVENTOR(S) : David A. Johnson It is certified that error appears in the above-identified patent and that said Letters Patent is hereby corrected as shown below:

Column 1, Line 36, "chanber" should read --- changer ---;

Column 1, Line 65, "arry" should read --- array ---;

Column 3, Line 35, "mountedon" should read --- mounted on ---;

Column 3, Line 52, "moted" should read --- moved ---;

Column 4, Line 32, "statonary" should read --- stationary ---;

Column 4, Line 53, "curretn" should read --- current ---;

In the ABSTRACT, Line 2, "which a any" should read --- which any ---;

Column 4, Line 29, "[pen" should read ---  pen ---.

Signed and Sealed this

Twenty-sixth Day of November, 1991

Attest:

HARRY F. MANBECK, JR.

Attesting Officer

Commissioner of Patents and Trademarks